United States Patent [19]

Eibner

[11] 3,900,890

[45] Aug. 19, 1975

[54] SPEED TOLERANT RECORDING AND RECOVERY SYSTEM

[75] Inventor: Jules A. Eibner, Maple Glen, Pa.

[73] Assignee: Sperry Rand Corporation, Blue Bell, Pa.

[22] Filed: May 6, 1974

[21] Appl. No.: 467,323

[52] U.S. Cl. ........................ 360/73; 360/25; 360/51

[51] Int. Cl.$^{2}$ .................. G11B 15/52; G11B 15/18; G11B 27/36

[58] Field of Search ....... 360/73, 74, 71, 51, 25–27, 360/70; 318/310–311, 314; 178/6.6 A; 358/8

[56] References Cited

UNITED STATES PATENTS

| | | | |
|---|---|---|---|
| 3,172,091 | 3/1965 | Friend | 360/51 |
| 3,412,385 | 11/1968 | Wang et al. | 360/51 |
| 3,435,314 | 3/1969 | Bradley et al. | 360/71 |
| 3,668,492 | 6/1972 | Konishi | 360/73 |
| 3,772,468 | 11/1973 | Tatsuguchi | 360/73 |
| 3,805,286 | 4/1974 | Kavanagh et al. | 360/73 |

*Primary Examiner*—Alfred H. Eddleman
*Attorney, Agent, or Firm*—Charles C. English; Sheldon Kapustin; William E. Cleaver

[57] ABSTRACT

A digital tape handler is disclosed wherein data transfers to or from the tape are permitted to occur at below full tape speed. A first phase-locked oscillator is made to track the tape speed and controls the data transfer to the tape. A second phase-locked oscillator, which also tracks the speed of the tape, controls data transfers from the tape. A tape speed threshold circuit detects the speed of the tape and when the speed exceeds a predetermined fraction of the full tape speed turns the first and second oscillators on. Lower tape acceleration/deceleration rates during the tape starting and stopping operations are made possible by the invention.

7 Claims, 4 Drawing Figures

SPEED TOLERANT RECORDING AND RECOVERY SYSTEM

FIELD OF INVENTION

This invention relates to a magnetic recording device and in more particular to a digital magnetic tape handler of the type used in data processing systems.

BACKGROUND

Tape handlers of the present class are widely used as input-output devices in the data processing field. In this use, digital data, usually in binary bit form, is recorded on the tape during a write operation or is read from the tape during a read operation. In either case, tape movement may be started and stopped many times per second. During the tape starting operation, reading or writing is inhibited until the tape is brought up to speed. Similarly, during the tape stopping operation, reading or writing is inhibited during the period the tape is slowing down. Inhibiting the writing operation during the tape start-stop operations creates a gap between the data blocks recorded on the tape. This gap is referred to in the art as an "interblock gap". In the past "interblock gaps" as large as 0.6 inch were standard. More recently, however, an "interblock gap" of 0.3 inch has become standard. A gap of this small size means that if the tape stops with the read/write head in a centered position in the gap, only 0.15 inch of space is available to get the tape up to speed before the next data block space is encountered. Accordingly, where tape speeds of, say 300 inches per second are employed, tape acceleration rates of 300,000 inches/sec$^2$ are called for during the tape starting operation; and a deceleration rate of similar magnitude is called for during the tape stopping operation. Such high acceleration and deceleration rates require the use of a tape capstan motor and drive circuit having tremendously large power dissipation properties. In fact the power dissipation requirement goes up as a non linear function of the acceleration-deceleration rates imposed on the system by the gap size and the tape operating speed. A further requirement imposed on the tape handler, not by any standard but by the design of the data recovery system, is that of recording the data bits at a constant density such as say 6,000 or more bits per inch.

From a consideration of the foregoing requirements, it will be appreciated that if the tape system can be constructed to allow data transfer to take place over a wide range of tape speeds, lower acceleration and deceleration rates may be used during the tape start-stop operations. The ability to record and recover data bits at reduced speeds can thus help relax the mechanical strains on the system and also reduce the power dissipation requirements on the capstan motor and drive circuits therefor.

SUMMARY

It is accordingly an object of this invention to provide a digital data tape handler system where data recording and/or recovery can take place at tape speeds which are a predetermined fraction of the normal operating tape speeds.

It is another object of this invention to provide a tape handler system of the foregoing type in which the power dissipation requirement on the capstan motor, is reduced.

It is still another object of this invention to provide a tape handler system of the foregoing type in which the mechanical strain on the handler and the tape is reduced.

In accordance with the teachings of the present invention, a tachometer (speed sensor) is coupled to the tape transport mechanism and generates a signal whose frequency is proportional to the speed of the tape. A first phase-locked oscillator which operates to control the bit recording rate of the data is coupled to the tachometer. The first phase-locked oscillator has its frequency locked to the tachometer frequency whereby the bit recording rate is locked to the tape speed so that the recording bit density is held constant under varying tape speeds. A speed threshold circuit is coupled to the tachometer and the phase-locked oscillator. The threshold circuit operates to turn the phase-locked oscillator on when the speed of the tape is above a predetermined fraction of its full speed. Consequently, data can be recorded before the tape is up to speed during a tape starting operation and continues to be recorded until the tape drops below a fixed speed during a tape stopping operation.

A second phase-locked oscillator locked to the phase and frequency of the data read from the tape is included for controlling the data recovery circuits. This phase-locked oscillator is also turned on in response to the operation of the speed threshold circuit. The connection of the threshold circuit to the second phase-locked oscillator is such that it turns the second phase-locked oscillator on a short time interval after the first phase-locked oscillator has been turned on. An error voltage derived from the phase comparator of the first phase-locked oscillator is coupled to the second phase-locked oscillator. This error voltage operates so that when the second phase-locked oscillator is turned on, its frequency is substantially instantaneously brought into synchronism with the data bit recovery rate.

DESCRIPTION

Figure 1:
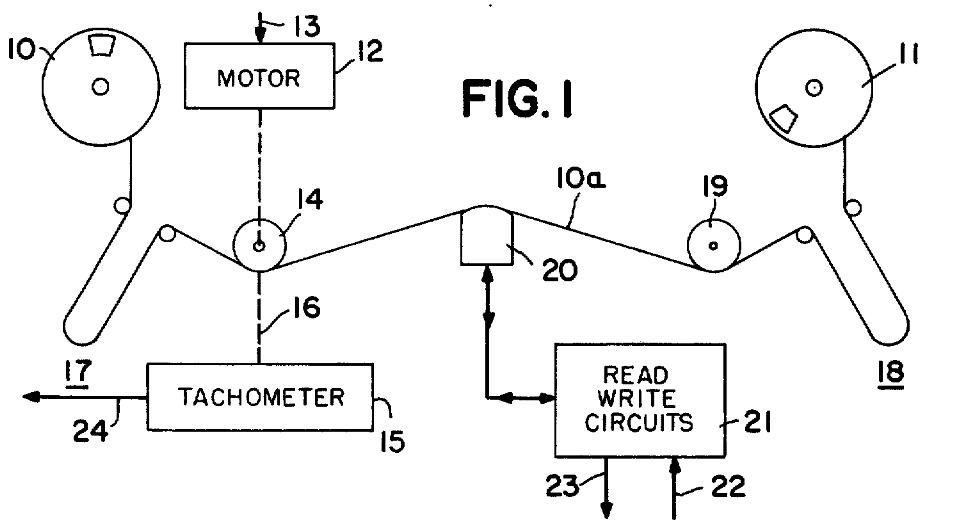
FIG. 1 is a diagrammatic illustration of a typical magnetic tape transport mechanism of the type used by the present invention.

Referring now to FIG. 1 it will be seen that the tape transport mechanism envisioned for use by the present invention typically includes a pair of tape reels 10 and 11 on which a magnetic tape **10*a* can be wound and unwound; a tape drive capstan 14 and a reversible drive motor 12 for moving the tape; a magnetic read/write head 20 across which the tape 10*a* moves; an idler mechanism 19 over which the tape passes, and a pair of slack tape loops 17 and 18. Also included in the transport mechanism is a read/write circuit 21 which is connected to the read/write head 20. Circuit 21 is connected to the write head to cause the input data appearing on input line 22 to be recorded on the tape, and to the read head to cause output signals to appear on the output path 23 during a tape read operation. Further included in FIG. 1 is a tachometer 15 which may be connected to the tape drive capstan 14 via shaft 16. In practice, tachometer 15, which is of conventional design, is preferably of the digital type, and may be either of the optical or magnetic variety. It functions to produce a repetitive pulse signal on its output terminal 24 having a repetition frequency proportional to the speed of rotation of the capstan 14.**

The conventional operation of the transport mechanism of FIG. 1 is as follows: A start signal is applied to the capstan motor 12 via lead 13. This causes motor 12 to be energized which in turn causes capstan 14 to rotate and thereby move tape 10*a* across the magnetic head 20. The direction of tape movement is determined by a "forward" or "backward" signal applied to motor 12 by means not shown. As the capstan 14 begins to move tape over the head 20, tape will be removed from one slack loop 17 or 18 and supplied to the other slack loop 17 or 18. Loop length sensors, again not shown, sense the length of the respective loops 17 and 18 and control a pair of reel motors, not shown, but associated with reels 10 and 11, to rotate the reels in such a direction as to maintain the relative lengths of the loops 17 and 18 in a predetermined relationship to one another. After the tape has been brought up to speed, data is read from the tape or written thereon by the circuit 21.

Figure 4:
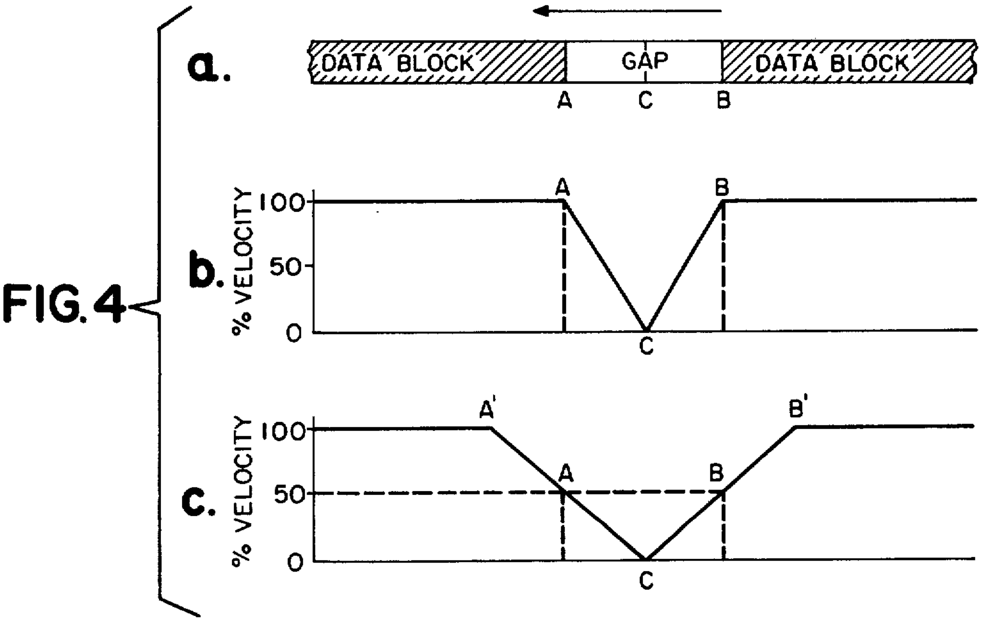

The foregoing operation of the tape transport is diagrammatically illustrated by diagram *a* and *b* of FIG. 4 to which reference is now made. In this figure, the diagram *a* represents a section of the tape 10*a* and the arrow superimposed over this diagram represents one direction of tape movement over the head 20. Further in this diagram point C should be taken as the position of the head on the tape at rest. When the start signal is applied to the motor 12, tape is accelerated to its full speed condition as indicated by the line C—B in diagram *b*. At point B, when the tape has reached full speed, a data block can be written or read from the tape. After a data block has been read or written on the tape, a stop signal is applied to the motor 12 and the tape decelerates along the line A—C of diagram *b* to bring the tape to a stop position again at point C.

From the foregoing description it will be recognized that the acceleration/deceleration rates imposed on the capstan motor 12 are increased as the gap size is reduced and/or as the full speed tape velocity is increased. It will also be recognized that as the acceleration/deceleration rates are increased, the power dissipation requirements imposed on motor 12 and the mechanical strain placed on the tape transport mechanism itself are increased.

The present invention, however, as shown by diagram *c* of FIG. 4, effectively reduces the acceleration/deceleration rates imposed on the system by permitting data transfer to occur as long as the speed of the tape exceeds a predetermined fraction, say 50% or more, of its full tape speed. By establishing such a speed threshold, lower acceleration/deceleration rates such as shown by lines A'—C and C–B' in diagram c become possible while still maintaining the desired interblock gap size. The present invention also operates to vary the bit recording rate in accordance with the tape velocity so that the requirement of preserving a constant bit rate can be satisfied.

Figure 2:
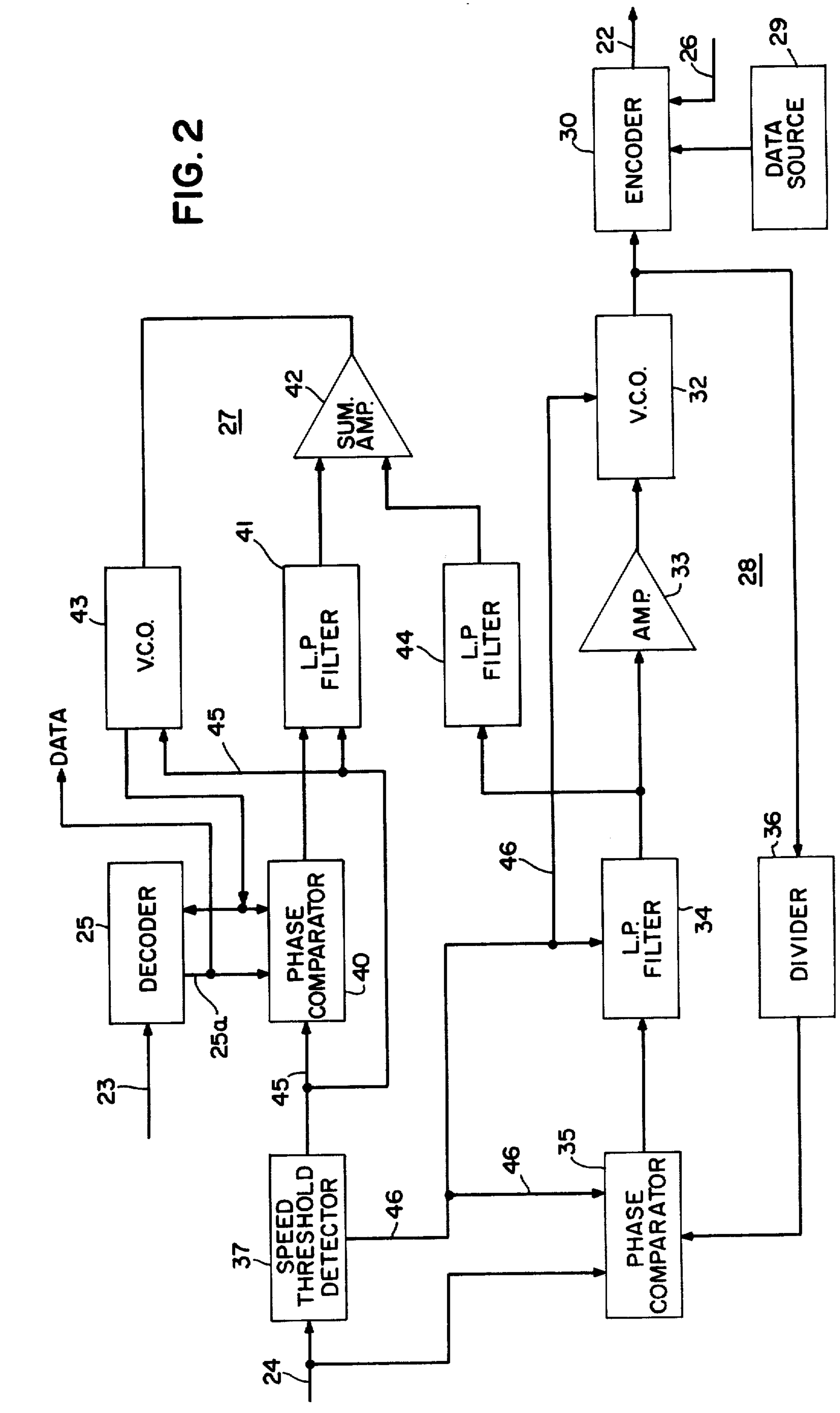
FIG. 2 is a block diagram of the present invention.

Referring now to FIG. 2 it will be seen that the first phase-locked oscillator used to control the bit writing rate is shown in general at 28. The second phase-locked oscillator used to control the bit recovery circuits is shown in general at 27, and the speed threshold circuit which is used to turn on the phase-locked oscillators 27 and 28 is shown at 37. The phase-locked oscillators 27 and 28 are, in general, conventional in organization and may, for example, be of the type illustrated in U.S. Pat. No. 3,577,132. The phase-locked oscillator 28, for example, includes a voltage controlled oscillator 32 whose output frequency is controlled by an error voltage applied to its input control terminal. The error voltage is derived from the output of a phase comparator 35, such as shown by U.S. Pat. No. 3,701,039, and is applied through a low pass filter 34 and an amplifier 33 to the frequency control input of the voltage controlled oscillator 32. The low pass filter 34 is preferably of the Bessel type. It has, in the assumed example, a cut-off frequency approximately equal to the pulse frequency of the tachometer 15 when the tachometer is operating at 50% speed. The phase comparator 35 has two signal inputs thereto one of which is connected to the signal output line 24 of the tachometer 15 and the other of which is connected to the signal output terminal of the voltage controlled oscillator 32 via a frequency divider circuit 36. In practice, the recording bit rate of the system may be several times greater than the frequency rate of the tachometer 15 and the divider 36 is used to scale the frequency of the voltage controlled oscillator 32 down to a value equal to the full speed tachometer frequency. For example, if the normal full speed signal frequency from the tachometer 15 is, say 32KH, and the normal output frequency of the V.C.O. 32 is 640 KHZ, then the divider 36, in this example, divides the output signal frequency of the V.C.O. 32 by 20.

The second phase-locked oscillator 27 has a configuration similar to the first phase-locked oscillator 28. It contains, for example, a voltage controlled oscillator 43 similar to the oscillator 32, and a phase comparator 40 similar to the comparator 35. The phase comparator 40 has an error output terminal connected through a low pass filter 41 and a summing amplifier 42 to the frequency control terminal of the voltage controlled oscillator 43. The phase comparator 40 like phase comparator 35 has two signal inputs. In this case, however, one of the inputs is derived from the voltage controlled oscillator 43 and the second input is derived from the data output line 25a of the data recovery decoder circuit 25. The design of the decoder 25 is standard and will vary in dependency upon the type of encoder 30 used by the tape recording system.

Although the configurations used by the two phase-locked oscillators 27 and 28 are, in general, similar there is at least one significant difference between the two. This difference is that the second phase-locked oscillator 27 includes a summing amplifier 42 in place of the conventional operational amplifier 33. The summing amplifier 42 has two inputs one of which is derived from the error output of the phase comparator 40 via the low pass filter 41 while the second input is derived from the error output of the phase comparator 35 via the low pass filters 34 and 44. Filter 44, like filter 34, is preferably of the Bessel type and has a slightly lower cut-off frequency than filter 34. The purpose of the summing amplifier 42 and its connection via filters 34 and 44 to the output of the phase comparator 35 will be described subsequently.

In operation, the phase-locked oscillators 27 and 28 are controlled or turned on by a tape speed threshold circuit 37. This circuit, includes an input terminal which is connected to the output 24 of the tachometer 15 and a pair of output terminals 45 and 46. The function of the threshold detector 37 is to detect the speed of the tape and when the speed of the tape is above some predetermined fraction of its full speed, say 50% to turn on the phase-locked oscillators 27 and 28 by activating the output lines 45 and 46. Line 46 may, for example, be connected to the V.C.O. 32, the low pass filter 34 and the phase comparator 35 of the phase-locked oscillator 28. Line 45 is connected, as shown, to the corresponding elements of the phase-locked oscillator 27. Typically, the connection of the control lines 45 and 46 to the phase comparators 35 and 40 and to the filters 34 and 41 is designed to initialize the conditions in these components while the connections of lines 45 and 46 to the V.C.O.'s 32 and 43 is designed to key these oscillators on in an established phase condition.

Figure 3:
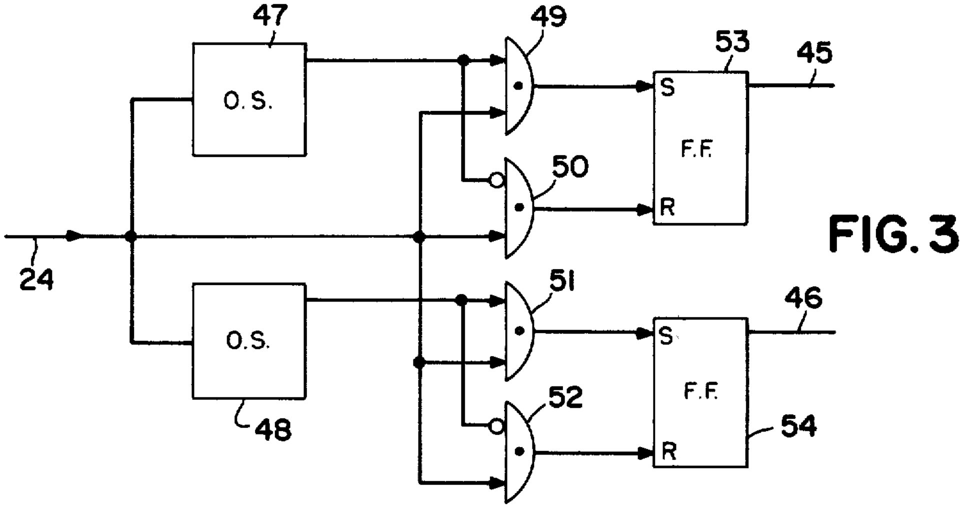
FIG. 3 is a block diagram of a typical "Speed Threshold Detector" 37 used in the structure shown in FIG. 2, and FIG. 4 comprises a series of diagrams which are useful in illustrating the operation and advantages of the present invention.

The details of a typical tape speed threshold circuit 37 is shown in FIG. 3 to which reference is now made. As illustrated in this figure, the threshold circuit includes a pair of one-shot or single pulser type circuits 47 and 48 and a pair of output flip-flops 53 and 54. The signal output terminal 24 of the tachometer 15 is connected in parallel to the triggering input terminals of the one-shot circuits 47 and 48 and also through a first pair of gates 49 and 50 to the set and reset inputs of the first flip-flop 53 and a second pair of gates 51 and 52 to the set and reset input terminals of the second flip-flop 54. The output of the one-shot 47 is connected to gates 49 and 50 to control their operation while the output of one-shot 48 is connected to gates 51 and 52 to control their operation. In more particular, one shot 47 when triggered to its active state enables the set gate 49 and inhibits the reset gate 50, and when inactive inhibits set gate 49 and enables reset gate 50. One shot 48 controls the set and reset gates 51 and 52 of flip-flop 54 in a similar manner. The one shot generators 47 and 48 are both designed to be triggered by the trailing edge of the tachometer pulses applied to line 24 and one shot 48 is set to remain in a triggered state slightly longer than one shot 47. In practice, one shot 48 may be adjusted so that its active state persists for a period essentially equal to the spacing between tachometer pulses when the tape speed is 50% of its full value. As an example, if the full speed repetition period of the pulses derived from tachometer 15 is 30 microseconds the active period of one shot 48 would be set to persist for approximately 60 microseconds. One shot 47, on the other hand, is adjusted so that its active state persists for a period of time somewhat less than that of one shot 48. For instance, in the assumed example, one shot 47 may be designed to have an active state of say 50 microseconds.

The operation of the threshold circuit 37 is as follows: The trailing edge of the tachometer pulses applied to line 24 trigger both one-shot circuits 47 and 48 to activate gates 49 and 51 during the active periods of the respective one shots. During tape start-up and before the tape reaches 50% of full speed the spacing of the tachometer pulses are such that both the one shots 47 and 48 return to their inactive condition before the next tachometer pulse is received on line 24. In this case the reset gates 50 and 52 for both flip-flops 53 and 54 will be active when the successive tachometer pulses are received and the flip-flops 53 and 54 will be held in a reset condition. When the speed of the tachometer, and hence the tape, reaches 50% of its full speed the spacing between successive tachometer pulses on line 24 closes to a point where they arrive at set gate 51 before one shot 48 recovers. Gate 51 passes the tachometer pulses to set flip-flop 54 and activate line 46. Activating line 46 turns the first phase-locked oscillator 28 on. As the tape speed continues to increase the spacing between successive tachometer pulses reaches a point where they arrive at gate 49 before one shot 47 recovers. When this occurs, flip-flop 53 is set and line 45 activated. Activating line 45 turns on the phase-locked oscillator 27. Once the flip-flops 53 and 54 have been set they remain set until the speed of the tachometer 15 drops below its 50% full speed value at which point the flip-flops will be reset by the tachometer pulses passing through the reset gates 50 and 52. Resetting the flip-flops 53 and 54 turns the oscillators 27 and 28 off and stops the data transfer operation.

In summary, the operation of FIG. 2 during a record or "write" instruction is as follows: A start signal is applied to motor 12 (FIG. 1) to initiate movement of tape 10*a* across the record head 20 and to generate tachometer pulses on line 24. The tachometer pulses on line 24 are applied to the threshold detector 37 and phase comparator 35. When the speed of the tachometer 15 reaches approximately 50% of its full speed or, if desired some other predetermined fraction of its full speed, the output line 46 of the speed threshold detector 37 becomes active to activate the phase comparator 35, the low pass filter 34 and the V.C.O. 32. At this point, comparator 35 acts to compare the tachometer pulse frequency against the frequency divided output from the V.C.O. 32 and to produce an output error voltage corresponding to the frequency difference between the comparator input signals. The error output voltage from comparator 35 is applied through the low pass filter 34 and amplifier 33 to the frequency control terminal of oscillator 32 to lock the frequency of the oscillator 32 to the tachometer 15. The output pulses from oscillator 32 act to clock the data signals from data source 29 through the encoder 30 to its output line 22 and thence to the write circuits 21. Encoder 30 is assumed to have been rendered active by a "write" signal on its control line 26. The write circuit 21 causes the data from source 29 to be written on the tape 10*a*. At the end of a "write" instruction, a stop signal is applied to the capstan motor 12 to cause it to slow down to a stop. As the tape begins to slow down the recording operation continues until the tachometer 15 speed falls below its 50% level. When this occurs, line 46 from the threshold detector 37 becomes deactivated to deactivate the phase-locked oscillator 28 and terminate the recording operation.

Encoder 30, which forms no part of the present invention, may be any one of a variety of known circuits. Its purpose is to encode the data from source 29 before it is written on the tape 10*a*.

Now assume a read instruction. During a "read" instruction, tape movement is started as above-described and the operation of the phase-lock oscillator 28 is the same as described above except the encoder 30 is held inactive due to the absence of the "write" control signal on line 26. As the tape comes up to a predetermined fraction of its full speed, line 45 of the threshold detector 37 becomes active. Activating line 45 switches the phase-locked oscillator 27 on. Decoder 25 receives the read output 23 from the read/write circuits 21 and applies the decoded data output on line 25a to one input of the phase comparator 40 in the phase-locked oscillator 27. Phase comparator 40 compares the frequency output of oscillator 43 against the frequency of the data signal output from decoder 25 to generate an error signal which is applied through low pass filter 41 and summing amplifier 42 to the frequency control terminal of oscillator 43 to cause the latter to lock onto the data pulse rate from the output of the decoder 25.

Since the data recovery rate from the tape is also a function of the tape speed, a tape velocity component is added to the error correction voltage obtained from the output of the phase comparator 40. This is done by connecting the output of the phase comparator 35 through filters 34 and 44 to the second input of the summing amplifier 42. The output from amplifier 42 is in turn connected to the frequency control terminal of V.C.O. 43 so that the frequency of this oscillator is controlled by an error voltage obtained from both its own comparator 40 and the tachometer comparator 35. The error voltage obtained from comparator 35 is developed before line 45 is rendered active so that when line 45 from the threshold detector 37 becomes active to turn the phase-locked oscillator 27 on, the oscillator 43 will have available to it an instantaneous error voltage to cause oscillator 43 to rapidly lock onto the data bits obtained from the output 25a of the decoder 25. Moreover, the connection of the error output voltage of the phase comparator 35 of the phase-locked oscillator 28 to the summing amplifier 42 of the phase-locked oscillator 27 acts to impart a velocity component to the latter oscillator and to thus cause this oscillator to better track the speed variation of the tape.

What is claimed is:

1. In a digital data tape handling system wherein there is included a tape transport mechanism for moving tape over a transducer element; an improved data transfer circuit for controlling the transfer of data to or from said transducer element which comprises: an oscillator means for generating a repetitive clocking signal for clocking the transfer of data through the transfer circuit, said oscillator means having a repetition frequency which varies in accordance with a reference signal applied thereto, reference signal generating means coupled to said tape transport mechanism for generating a reference signal which varies in dependence upon the speed of the tape over the recording head, a threshold circuit coupled to said reference signal generator means for producing a control signal when the speed of the tape exceeds a predetermined fraction of its full speed, and means responsive to said control signal to render said oscillator means operative to clock the transfer of data through said data transfer circuit.

2. The system of claim 1 wherein said oscillator means comprises a first oscillator circuit connected to clock recording data through the data transfer circuit to the tape and a second oscillator circuit connected to clock data recovered from the tape through the data transfer circuit.

3. The system of claim 2 wherein said first and second oscillator circuits are phase-locked oscillators each of which includes a voltage controlled oscillator section and a phase comparator section, said phase comparator section being operable to generate an error correction voltage for its associated oscillator, and said reference signal generator is coupled to the phase comparator section of said first oscillator to lock its frequency to the speed of the tape.

4. The system of claim 3 wherein the error voltage derived from the phase comparator of the first phase-locked oscillator is applied to the second phase-locked oscillator to control its frequency.

5. The system of claim 4 wherein the second phase-locked oscillator includes a summing amplifier for applying the error voltage derived from the associated phase comparator to the associated voltage controlled oscillator and into which the error voltage from the first phase-locked oscillator is fed.

6. The system of claim 2 wherein said threshold circuit includes means for generating a first control signal for controlling the operation of the first oscillator circuit and a second control signal for controlling the operation of the second oscillator circuit.

7. The system of claim 6 wherein the last named means produces the first control signal at a first tape speed and the second control signal at a second higher tape speed.

* * * * *